April 21, 1931. J. T. DICKSON 1,801,590
CLUTCH AND OPERATING DEVICE
Filed June 19, 1928

James T. Dickson
Inventor.

Patented Apr. 21, 1931

1,801,590

UNITED STATES PATENT OFFICE

JAMES T. DICKSON, OF LOS ANGELES, CALIFORNIA

CLUTCH AND OPERATING DEVICE

Application filed June 19, 1928. Serial No. 286,582.

The present invention relates to clutches and clutch operating devices of the type described in my Patent No. 1,618,644.

One of the objects of this invention is to provide an automatic torque regulating clutch operating device which may be adapted to a wide variety of common types of clutches to attain all the advantages peculiar to the clutch described in the aforesaid patent.

Another object of the invention is to provide a simple and complete clutch and pulley attachment for common types of electric motors; thereby providing a complete power unit in which the load is taken by the motor only when the motor has had ample time to reach full speed and whereby the load is released when it becomes excessive.

Many other objects and advantages of my invention will appear hereinafter.

I have illustrated by the accompanying drawings one practical embodiment of my invention.

Figure 1:
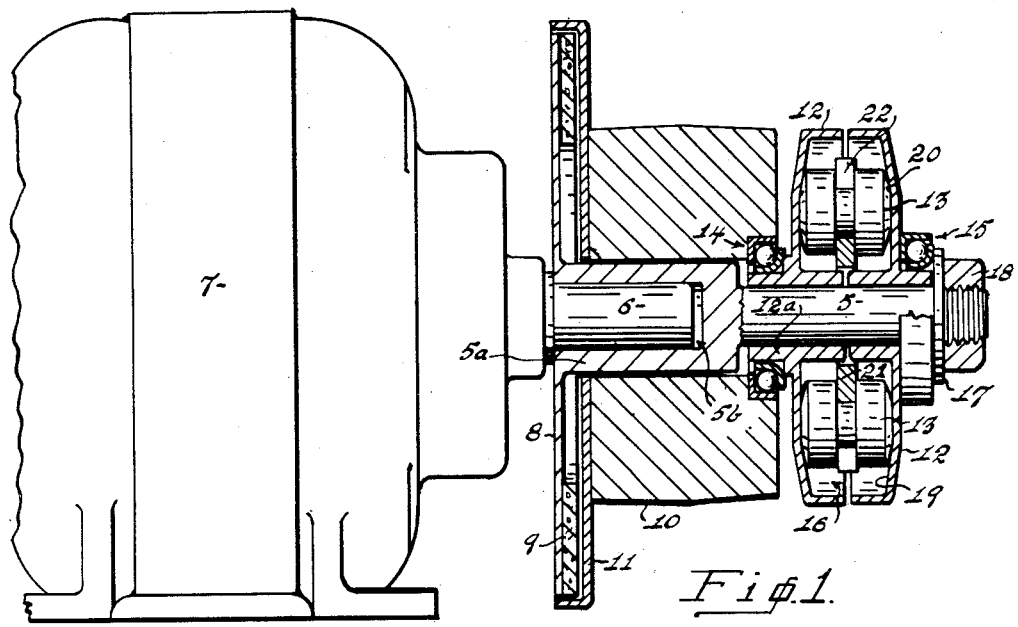
Figure 1 is a view in vertical section and elevation of the said embodiment.
Figure 2:
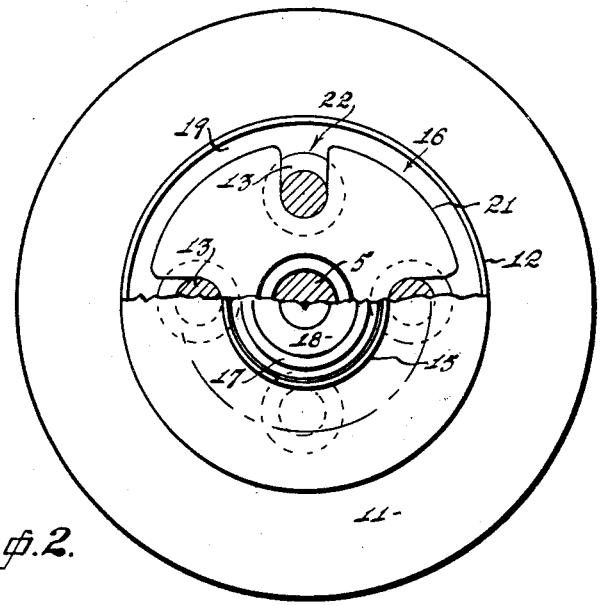
Figure 2 is a view in end elevation thereof, the view showing parts broken away to reveal underlying parts hereinafter known as the weights and spider respectively.

More specifically, in carrying out my invention in the present embodiment I provide an extension shaft 5 adapted to be fitted to a common motor shaft 6 such as found on the motor 7. The extension shaft is accordingly provided with an enlarged portion 5a provided with a socket 5b in which the shaft 6 of the motor is inserted with a press fit or key (not shown) to cause the extension shaft to revolve positively with the motor shaft.

Integral with the extension shaft there is provided a driving member or clutch disc 8 carrying a suitable clutch facing 9 composed of cork, brake lining or the like.

Loosely mounted around the larger part 5a of the motor shaft 5 I have provided a common wood pulley 10; the pulley being fitted with an attached driven member or clutch disc 11. It will be apparent now that the pulley under load may remain motionless on the shaft while the motor revolves, provided the clutch discs are disengaged as shown. Should the pulley and driven disc however be moved axially of the shaft into contact with the driving member, then the motor would be frictionally connected to the pulley thru the friction facing 9. In order to automatically engage and disengage the clutch discs as required I provide the operating mechanism which I will now describe. The said operating mechanism consists primarily of two similar cupped discs 12, 12, the weights 13, 13 and the thrust bearings 14 and 15 respectively.

The thrust bearings are of a common commercial type each fitted closely around a corresponding annular extension 12a of the corresponding member 12. The cupped members are loosely fitted on the shaft 5. The cupped discs are juxtaposed on the shaft with their open sides toward each other so that they enclose a space 16. One thrust bearing, which is adapted to carry both radial and end thrust, is disposed between the pulley and the corresponding adjacent cupped member 12, while the other bearing is positioned adjacent the other cupped member and between it and an end collar 17 which is held by a nut 18 threaded to the shaft 5.

The space 16 is of decreasing laterally measured width by reason of the members 12 providing opposed faces 19 converging radially outwardly. In the space 16 are positioned suitable weights arranged to be moved radially outward by centrifugal force to spread the members 12, 12 apart axially of the shaft. These weights have correspondingly tapered outer surfaces 20 contiguous to the faces 19 and the angle of the faces 19 is predetermined so that with a given rotative speed the weights will move said members 12, 12 apart with a given thrust.

While the weights are loosely contained in the space 16 so as to be movable freely radially and even circumferentially if required, they are held in circumferentially spaced relation to each other by the spider, which also serves to hold the weights in correct transverse position so that they do not become tilted from the horizontal. For such purpose the spider is provided with radial notches 22, and each weight is of spool shape and fitted loosely in the corresponding notch.

Considering the operation of the complete unit; When the motor is at rest the parts assume the position shown; that is to say, all parts tend to assume a position where the clutch discs are not in actual contact and where the members 12, 12 are not imposing any thrust on the bearings or upon the pulley and clutch discs. The lowermost of the weights is in slight frictional contact with both faces 19 and is held there by gravity, thus acting to hold the members 12, 12 apart sufficiently to take up lost motion adjacent the bearings but not necessarily sufficient to hold the driven disc in contact with the driving disc.

With the parts in the position shown the motor is started, and like all electric motors starting without load will quickly attain full speed. Owing to the slight gravity-imposed frictional contact of the members 12, 12 with the shaft 5, the members eventually reach a rotative speed approximate to that of the motor but of course at a delayed or retarded rate.

As the weights attain a given speed they fly outward radially and act on the faces 19 to force the members 12, 12 apart, these members acting thru the thrust bearings as explained to force the pulley axially of the shaft a slight distance and so force the driven disc into frictional contact with the driving disc so that the pulley is driven by the motor. In my improved clutch the operating device, which is loose with regard to both the driving and driven members, is slowly and constantly accelerated whether or not the discs are in engagement, and first slight contact of one disc with the other would in no way either appreciably retard or accelerate the centrifugal weights, particularly because of the friction reducing thrust bearings and the otherwise indirect connection of the operating device to the other rotating parts.

Accordingly the motor is slowly and gradually connected with the load and the motor is never overloaded nor is the load imposed until the motor has "settled down" to full speed, after starting. When the torque becomes excessive the clutch will slip since the thrust is limited by centrifugal force and is arranged and predetermined so that the motor can not overload. Should the motor tend to lag for any reason, the clutch will fully or partially release as the case may be to assist the motor back to normal speed.

The construction shown is by way of example and does not limit the scope of the invention, any construction coming within the scope of the appended claim being permissible without departing from the spirit of my invention.

I claim:

An attachment of the class described comprising; an extension shaft having a portion of enlarged diameter to be fitted over a motor shaft and a portion of reduced diameter to extend co-axially beyond said motor shaft, a driving disc on said extension shaft, adjacent the portion of larger diameter, a pulley loosely encompassing the portion of larger diameter, a driven disc fixed to said pulley adjacent the driving disc, said pulley with its driven disc and said driving disc being relatively movable axially of the shaft for frictional driving-and-driven engagement, and centrifugally effected operating means for so moving said pulley and driving member; said means comprising a pair of axially movable discs loosely encompassing the portion of lesser diameter of said extension shaft, a thrust bearing between said pulley and the adjacent one of said axially movable discs, a thrust collar on said shaft adjacent the other of said axially movable discs, a second thrust bearing between said last mentioned disc and said collar; said axially movable discs presenting inside faces converging radially from said shaft, and weights acting on said surfaces and disposed between said discs and movable radially by centrifugal force.

JAMES T. DICKSON.